Jan. 20, 1959 D. W. ORCHARD 2,870,351
COMBINED MACHINE FRAME AND MOTOR MOUNTING
Original Filed June 11, 1954 3 Sheets-Sheet 1

INVENTOR.
DAVID W. ORCHARD
BY Hudson, Boughton,
Williams, David & Hoffman
ATTORNEYS

INVENTOR.
DAVID W. ORCHARD

Jan. 20, 1959     D. W. ORCHARD     2,870,351
COMBINED MACHINE FRAME AND MOTOR MOUNTING
Original Filed June 11, 1954     3 Sheets-Sheet 3

INVENTOR.
DAVID W. ORCHARD

United States Patent Office 2,870,351
Patented Jan. 20, 1959

2,870,351

COMBINED MACHINE FRAME AND MOTOR MOUNTING

David W. Orchard, Willoughby, Ohio, assignor to The National Key Company, Cleveland, Ohio, a corporation of Ohio Original application June 11, 1954, Serial No. 435,968, now Patent No. 2,809,566, dated October 15, 1957. Divided and this application July 12, 1957, Serial No. 671,592

2 Claims. (Cl. 310—59)

This invention relates to a combined machine frame and motor mounting and provides such a combined structure which will be very practical and useful in those machines where compactness is desirable such as in key duplicating machines.

This application is a division of original application Serial No. 435,968, filed June 11, 1954, now Patent No. 2,809,566.

An object of this invention is to provide a combined machine frame and motor mounting in which the frame includes an end opening or socket portion and in which an associated driving motor has a housing portion engaged in such socket portion for mounting the motor on the frame.

Another object is to provide such a combined structure in which the frame has an air passage therein for a forced flow of cooling air and in which the cooperating socket and housing portions of the frame and motor provide the passage with an annular group of axial ports at or adjacent one end thereof.

A further object is to provide a combined structure of the character above indicated in which the motor is an electric motor, preferably a shaded pole motor, and wherein the ports are axial passages formed in and distributed around the housing of the motor and constitute an outward extension of the air passage of the frame.

Still another object is to provide a combined structure of the kind referred to above in which the frame includes a gear chamber into which the drive shaft of the motor extends while the other end of the motor projects from the mounting socket in overhanging relation to a laterally projecting portion of the frame.

The invention can be further briefly summarized as consisting in certain novel combinations and arrangements of parts hereinafter described and particularly set out in the claims hereof.

In the accompanying sheets of drawings forming a part of this specification:

Figure 1:
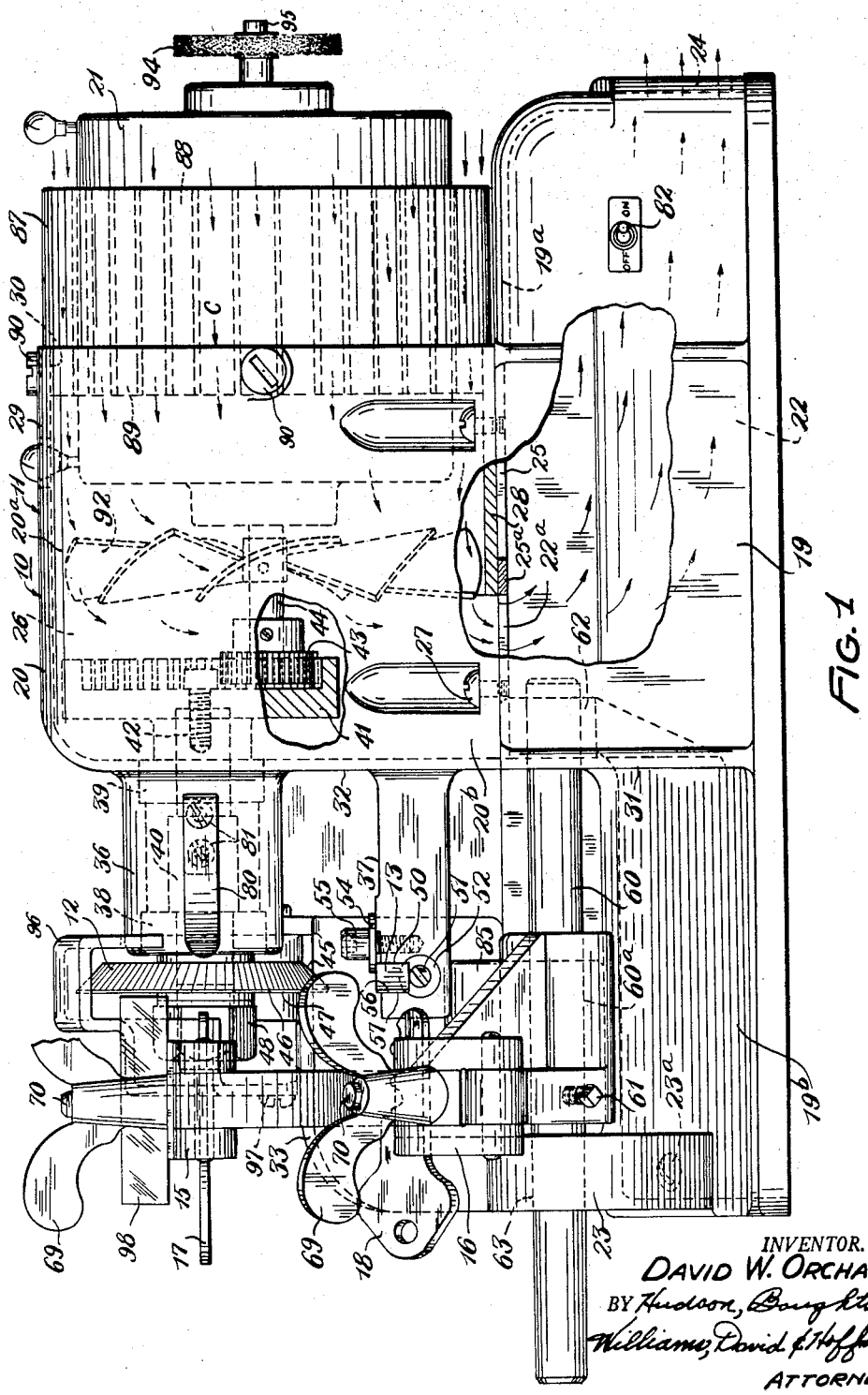
Fig. 1 is a front elevation of a key duplicating machine embodying the combined frame and motor mounting of the present invention.

As one practical embodiment of the invention, the drawing shows the combined frame and motor mounting C embodied in a key duplicating machine 10. The machine 10 comprises in general a frame structure 11 having thereon a cutter, 12, a cutting guide 13, and a workholder comprising a carriage 14 carrying clamping devices 15 and 16 which are adapted to receive and hold a key blank 17 and a key 18 to be duplicated. The carriage 14 is mounted so as to have both swinging and translatory movements, as will be further explained hereinafter, for simultaneously engaging the key blank 17 and the key 18 with the cutter 12 and the cutting guide 13 respectively.

The frame 11 comprises a pair of connected lower and upper frame members 19 and 20, of which the lower frame member forms the base of the machine and the upper frame member forms a support section on which an electric driving motor 21 is mounted. The base 19 is a generally rectangular hollow member having pairs of upright side and end walls and a partial top wall 19a. The base contains a chamber or space enclosure 22 having a top opening lying between flat internal longitudinal edge flanges 25 provided on this frame member. At an intermediate point of its length, the base 19 is provided at the top thereof with a flat transverse rib or web 25a extending across the top opening and joined to the longitudinal edge flanges 25.

The base 19 also has a laterally extending carrier portion 19b at one end thereof and on which a bearing bracket 23 is secured by the screws 23a. The end wall of the base remote from the carrier portion 19b is provided with a grill formation defining a row of vertical air ports 24 communicating with the chamber 22.

The upper frame member 20 is a hollow member which is seated on the base 19 such that a chamber or space enclosure 26 of this upper frame member overlies the chamber 22 of the base and communicates with the latter chamber through an exposed or uncovered portion 22a of the top opening thereof. The chamber 26 of the upper frame member 20 forms a combined gear and ventilation chamber in the frame 11. The quadrangular lower portion 20b of the upper frame member is secured against the top of the base 19 by suitable screws 27 which engage in threaded openings of the internal edge flanges 25.

The upper frame member 20 has a longitudinally extending transversely rounded top portion 20a which merges smoothly with the upright quadrangular lower portion 20b of this frame member. The upper frame member 20 also includes a transversely curved inner wall 28 which cooperates with the rounded top portion 20a in defining a substantially cylindrical hollow axial barrel or socket portion 29 having an end opening 30 and into which the driving motor 21 is adapted to be inserted.

When the frame members 19 and 20 are in their connected relation shown in the drawings, the end walls 31 and 32 of these members are in a substantially vertically aligned relation. The curved lower wall portion 28 covers a portion of the top opening of the base 19, as shown in Fig. 1, and is supported at its inner end by the flat transverse rib 25a. The uncovered portion 22a of the top opening of the base 19 forms a connecting passage or port between the chambers 22 and 26.

The upper frame member 20 also includes an upwardly and forwardly curved wall 33 projecting laterally therefrom above the carrier portion 19b of the base. The lower edge of this laterally projecting wall 33 engages the top of the upstanding rear wall 34 of the carrier portion 19b and the top of the bearing bracket 23 and is secured to the latter parts by screws 35.

The upper frame member 20 has a pair of integrally formed projections 36 and 37 thereon which extend laterally from the end wall 32 as shown in Fig. 1. The projection 36 is a mount for the rotary cutter 12 and the projection 37 is a mount for the cutting guide 13. The projection 36 has the upper edge of the curved wall 33 integrally joined thereto.

The projection 36 is a substantially cylindrical hollow projection having suitable axially spaced bearings 38 and 39 therein rotatably supporting a work shaft or arbor 40 carrying the cutter 12. The inner or power input end of the shaft 40 extends into the chamber 26 of the upper frame member 20 and has a ring gear 41 secured thereto as by means of the screw 42. A drive pinion 43 suitably mounted on the armature shaft 44 of the electric motor 21 meshes with the ring gear 41 so as to provide a geared drive for the cutter 12.

The cutter 12 is a cutting wheel of a conventional shape and construction having a beveled annular face 45 defining a peripheral cutting edge 46 adjacent the flat outer side face 47. The cutter is suitably secured on the outer end of the shaft 40 as by means of the clamping nut 48.

The projection 37 comprises an arm or bracket located below and to the front of the cutter shaft projection 36 and is provided with a transverse slot 50 adjacent its outer end in which the cutting guide 13 is mounted. The guide 13 comprises a bar of a substantially rectangular cross-sectional shape which is engaged in the slot 50 and projects forwardly from the support 37 in substantially right-angle relation thereto.

The guide 13 is endwise shiftable in the slot 50 by means of an adjusting screw 51 having its stem threadedly engaged in an opening 51a of the projection 37 and also having a circular thrust collar 52 engaged in a transverse slot 53 of the guide. By rotating the screw 51 in the threaded opening 51a of the projection 37, the collar 52 will impart a longitudinal adjusting movement to the guide 13. When the guide 13 has been thus adjusted by the screw 51, it is adapted to be clamped to the projection 37 by the collar 54 of a clamping screw 55. This adjustment for the guide 13 moves the reference edge 56 relative to the cutter axis so as to vary the distance of this reference edge from the cutter axis substantially in a direction radially of the cutter.

The cutting guide 13 can be in the form of a section of suitable length cut from bar stock of appropriate cross-sectional shape, preferably square as shown in the drawings. The outer end of this guide is beveled on an inclined plane so as to provide a relatively sharp, straight reference edge 56 lying in the vertical plane of the flat side face 57 of the guide. The reference edge 56 is inclined downwardly and rearwardly at an angle of approximately 45 degrees such that this edge lies in an inclined plane which is parallel to a plane which is tangent to the peripheral edge 46 of the cutter. This tangent plane is represented by the line 56a.

The carriage 14 is in the form of a substantially Y-shaped bracket having a pair of spaced arms 58 and 59 which extend forwardly and upwardly adjacent the cutter 12 and guide 13 respectively. The clamping device 15 for the key blank 17 is carried by the arm 58, and the clamping device 16 for the key 18 is carried by the arm 59. The lower end of the carriage 14 is secured to a slide shaft 60 which extends in parallel relation to the cutter shaft 40.

The carriage 14 has an opening 60a in its lower end through which the shaft 60 extends and in which this shaft is secured by means of the set screw 61. The shaft 60 forms a pivot shaft for the transverse swinging movement of the carriage 14 and also forms a slidable support for the translatory movement of the carriage in the direction of the axis of the cutter shaft. For this purpose, the shaft 60 is rockably and slidably mounted in a pair of axially spaced bearings 62 and 63. The bearing 62 is formed on or supported by the end wall 31 of the base 19 and the bearing 63 is in the bearing bracket 23.

The space 64 between the arm portions 58 and 59 of the carriage 14 is such that these arm portions will straddle the guide support 37 during at least a portion of the axial translatory movement of the carriage and also provides sufficient clearance to accommodate the cutting guide 13 and the guide support 37 during the transverse swinging movement of the carriage in engaging the key members 17 and 18 with the cutter and cutting guide. The spacing of the bearings 62 and 63 and the length of the pivot shaft 60 are such that the carriage 14 will be movable in a direction away from the wall 31 for a sufficient distance to permit the upper arm portion 58 to move past the outer end of the guide support 37 during swinging of the carriage downwardly from its cutting position, shown in full lines in Fig. 2, to its initial or unloading postion represented by the broken line showing 14a.

The clamping devices 15 and 16 are substantially identical in construction, and each comprises a generally flat lower support jaw 66 formed integral with the carriage 14 and against which the key or key blank is adapted to be clamped by a movable upper clamping jaw 67. The lower jaws 66 are formed on the carriage 14 so as to lie in the planes which are disposed in a substantially 45-degree angular relation to each other. The movable clamping jaw 67 is swingably connected with the carriage by a transverse pivot pin 68. A wing nut 69 provided on a clamping screw 70 is engageable with the movable jaw 67 for actuating the same into clamping engagement with the key member in opposition to the action of a compression spring 71 disposed around such screw and located between the jaws.

The screw 70 has one end thereof pivotally connected with the carriage 14 by means of a pivot pin or trunnion member 72 such that the clamping screw and wing nut can accommodate themselves to the different angular positions assumed by the movable jaw 67. A clearance opening 73, provided in the movable jaw and through which the screw 70 extends, permits this self-adjusting swinging movement of the screw. By reason of this pivotal connection of the clamping screw 70 with the carriage and the provision of the clearance opening 73, neither the screw nor the movable jaw 67 will be subjected to cramping or bending, and accordingly, the clamping device will be very easy to actuate and will have a positive gripping action on the key member.

The clamping devices 15 and 16 also include a transversely extending abutment or reference shoulder 75 formed on the lower jaw 66 and adapted to be engaged by an edge of the stem portion 76 of the key member for locating the key member in the clamping device. The clamping devices 15 and 16 also include a support lug or projection 77 formed as an integral extension of the lower jaw 66 and providing a relatively wide portion on this jaw which will be flatly engaged by and support the relatively wide body portion 78 of the key member when the latter is in its clamped position. This engagement of the relatively wide body portion of the key member with the support portion 77 prevents twisting or bending of the key member during the clamping of the same on the carriage and during the duplicating operation.

The key members 17 and 18 are of the kind having a reference shoulder 79 thereon at the junction of the stem portion 76 with the body portion 78. When the key members are being mounted on the carriage 14, the key 18 is inserted first in its clamping device 16 and, while the edge of the stem is being held against the reference edge 56 of the cutting guide 13 and the shoulder 79 is being held against the side face 57, the clamping nut 69 is tightened. Thereafter, the blank 17 is inserted into its clamping device 15 and, while the shoulder 79 is being held against the side face 47 of the cutter 12, the clamping nut 69 is tightened.

Figure 4:
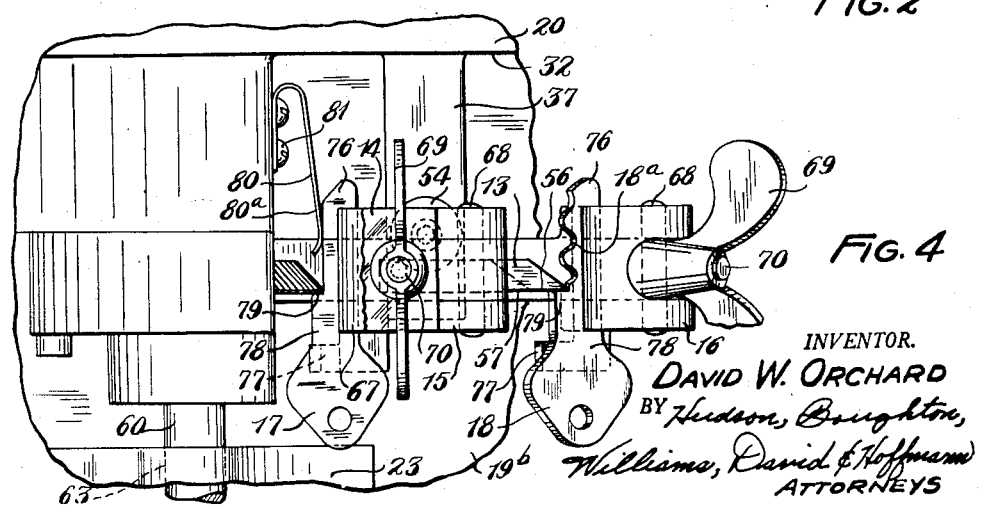
Fig. 4 is a partial plan view further illustrating the carriage and the cooperation of the key members with the cutter and cutter guide.
Figure 3:
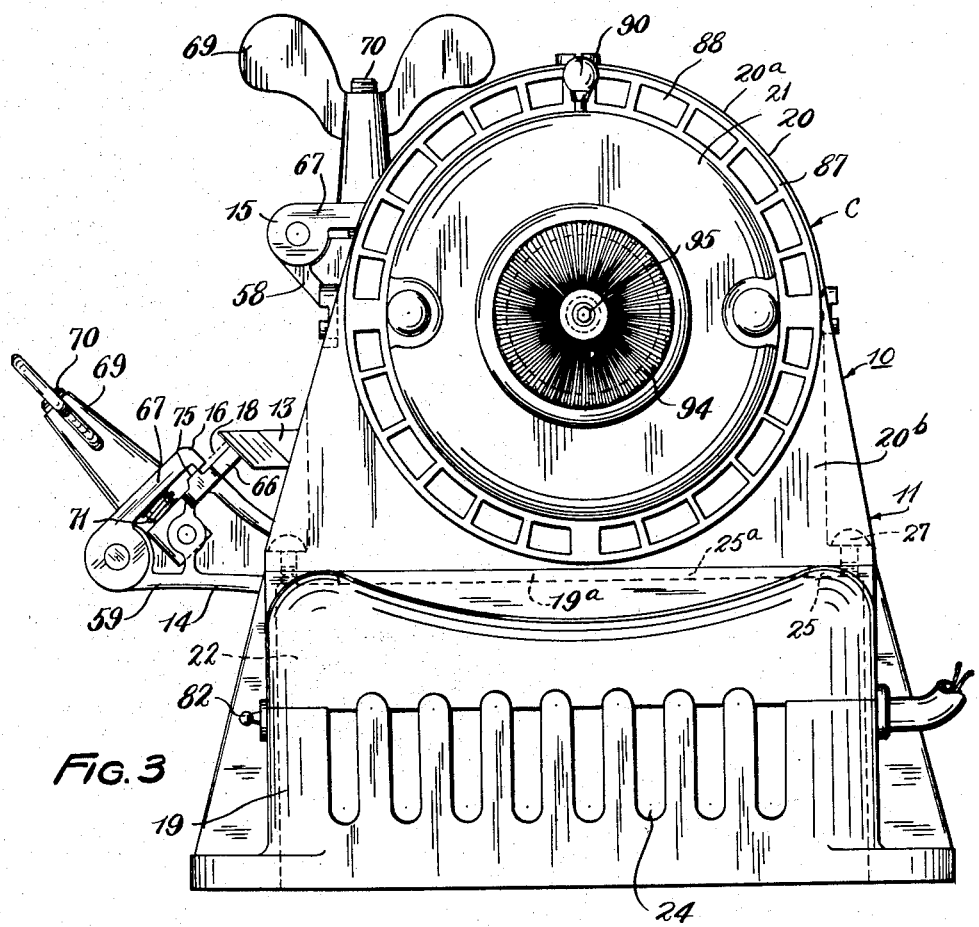
Fig. 3 is an end elevation of the machine as seen from the motor mounting end thereof.

It is important that the key blank 17 be firmly engaged with the shoulder 75 of the clamping device 15 prior to the tightening of the wing nut 69. For this purpose a yieldable pressure means is provided on the frame structure 11 for pressing the blank 17 against this shoulder when the blank is engaged against the cutter and is being clamped in the device 15. This pressure means is here shown as comprising a plate spring 80 secured to the frame projection 36 by means of the screws 81 and having an arm 80a which is engageable by the exposed edge of the stem of the key blank, as shown in Fig. 4.

Swinging of the carriage 14 toward the cutter 12 while the key blank 17 is being located in the clamping device 15 will cause the spring arm 80a to engage the key blank and press the same against the shoulder 75, whereupon the wing nut 69 is tightened to lock the blank in the clamping device. The spring 80 thus automatically insures proper alignment of the key blank in the clamping device 15 such that a tilted position, which would result in improper cutting of the key blank, will be avoided.

When the key members have thus been located and secured in proper relation in the clamping devices 15 and 16, the carriage is swung down to its initial position 14a to disengage the key blank 17 from the cutter 12 until the motor 21 can be started by actuation of a suitable control switch 82 provided on the base 19. The carriage 14 is then swung upwardly to its full-line position to thereby engage the key members 17 and 18 with the cutter 12 and the guide 13 respectively for the performance of the cutting or profile duplicating operation on the key blank. During the cutting operation, the irregular profile 18a of the key to be duplicated is moved along the reference edge 56 of the cutting guide 13 by manual shifting of the carriage 14 such that a resulting combined swinging and translatory movement of the carriage will cause the cutter 12 to generate a similar profile on the key blank 17.

The location of the clamping devices 15 and 16 on the carriage 14 is such that the key blank 17 will be supported in the cutting position by the lower jaw 66 with the mid plane of the key blank coinciding substantially with a horizontal plane passing through the rotational axis of the cutter 12 and represented by the line 83. The location of the clamping device 15 is also such that the edge of the stem of the key blank 17 will be presented to the peripheral cutting edge 46 in a substantially normal relation thereto. Similarly, the location of the clamping device 16 on the carriage 14 is such that the key 18 will be supported by the lower jaw 66 so that the stem of this key will be presented edgewise to the reference edge 56 of the cutting guide 13 and in a substantially normal relation to such reference edge.

By having the clamping devices 15 and 16 located so as to support the key members in this relation, the movements imparted to the blank 17 during the cutting operation by the swinging of the carriage 14 will be very small movements lying substantially in the horizontal radial plane 83 such that a minimum amount of error will occur in the profile being cut as the result of such swinging movement. The edge of the profile being generated on the blank 17 will thus also extend transversely of the stem at right angles to the general plane of the stem. A more accurately formed key will thus be produced, and when a succession of keys are produced by duplication of one from another, the additive error will still be so small that the final key will have substantially the same profile as the first key of the series.

The carriage 14 is subjected to a biasing force tending to move the same toward one or the other of the extreme limits of its swinging movement. This biasing force is preferably supplied by a counterweight 85 of a suitable size and shape and which is secured to or formed as a part of the carriage. The provision of the counterweight 85 causes the carriage to have a center of gravity which will move across a vertical neutral axis 86 on an arc located above the pivot shaft 60, during the transverse swinging movements of the carriage. The neutral axis 86 preferably extends through the axis of the cutter shaft 40 and the axis of the pivot shaft 60 of the carriage.

During the intermediate portion of the swinging movement of the carriage 14, its center of gravity will be on or near the neutral axis 86, but when the carriage is manually swung in either direction to cause the center of gravity to move away from the neutral axis, the counterweight 85 becomes effective to apply an actuating force to the carriage tending to move the same toward the extreme limit of its swinging movement. Thus, when the key members 17 and 18 have been mounted on the carriage as explained above and the carriage is swung upwardly toward the cutter 12, the counterweight 85 will become effective as the center of gravity moves toward the left across the neutral axis 86 such that the force supplied by the counterweight will assist in holding the key members in engagement with the cutter and cutting guide. Similarly, when the carriage is swung downwardly to its initial position 14a at the completion of the cutting operation, the force supplied by the counterweight 85 will become effective to assist in moving the carriage to its extreme lower position and will be sufficient to hold the carriage in such lower position until the first set of key members is removed therefrom and until the carriage is again manually swung upwardly preparatory to the mounting of another set of key members thereon. The intermediate position of the carriage 14 in which its center of gravity is located on the axis 86, can be referred to as its neutral or dead-center position.

The electric motor 21 is preferably a shaded pole motor, which is a very inexpensive form of motor. Such a shaded pole motor has been found to be a very satisfactory driving means in situations where it is called upon to deliver power only intermittently and for short working periods, such as in the key duplicating machine 10, and where sufficient cooling is provided for the motor. In the frame structure here shown for the machine 10, the chambers 22 and 26 of the frame members 19 and 20 are in communication through the opening 22a and define a passage for circulating an adequate flow of cooling air through the frame structure and across the motor.

The housing of the motor 21 includes an intermediate ring member 87 which has an annular series of axially elongated air ports or passages 88 formed therein and distributed around the periphery thereof. The ring member 87 has an end portion 89 of a size to be engageable in the end opening 30 of the socket portion 29 of the frame member 20 and which end portion can be a relatively reduced end portion. The motor 21 is mounted on the frame 11 by such engagement of the end portion 89 in the end opening 30 and by the retaining screws 90. When the motor 21 is mounted in this relation, the air ports 88 communicate with the air circulating passage and form an air inlet end extending along and around the motor. The grill openings 24 of the base 19 form the outlet end of the air circulating passage.

Although the air inlet ports 88 are described above as being in the housing of the motor 21, they could, if desired, be formed in an extention portion of the frame member 20 so as to surround the motor when the latter is inserted into the end opening 30.

Prior to the mounting of the motor 21 on the frame 11, an air impeller 92 and the drive pinion 43 are mounted on the motor shaft 44. The impeller 92 is here shown as being a fan of the propeller type and of a size to be rotatably operable in the barrel portion 29 of the frame member 20. The motor 21, together with the drive pinion 43 and impeller 92, constitutes a preformed motor unit which is assembled on the frame 11 by inserting one end of such unit through the end opening 30 to thereby engage the drive pinion 43 with the teeth of the ring gear 41. The motor unit will thus also be readily dismountable from the frame 11.

When the motor unit has been mounted on the frame structure 11 as above explained, the running of the motor 21 will drive the impeller 92 simultaneously with the operation of the cutter 12 to thereby cause a flow of cooling air to be circulated through the frame structure in heat-exchange relation to the motor. The cylindrical barrel portion 29 of the frame member 20 forms a surrounding shroud for the impeller 92 such that the impeller will effectively produce a positive flow of the cooling air.

A wire brush 94 mounted on a suitable projection 95 of the motor shaft will be rotated by the motor and will be available for removing burrs from the processed key members when such members are engaged against such rotating brush.

Figure 2:
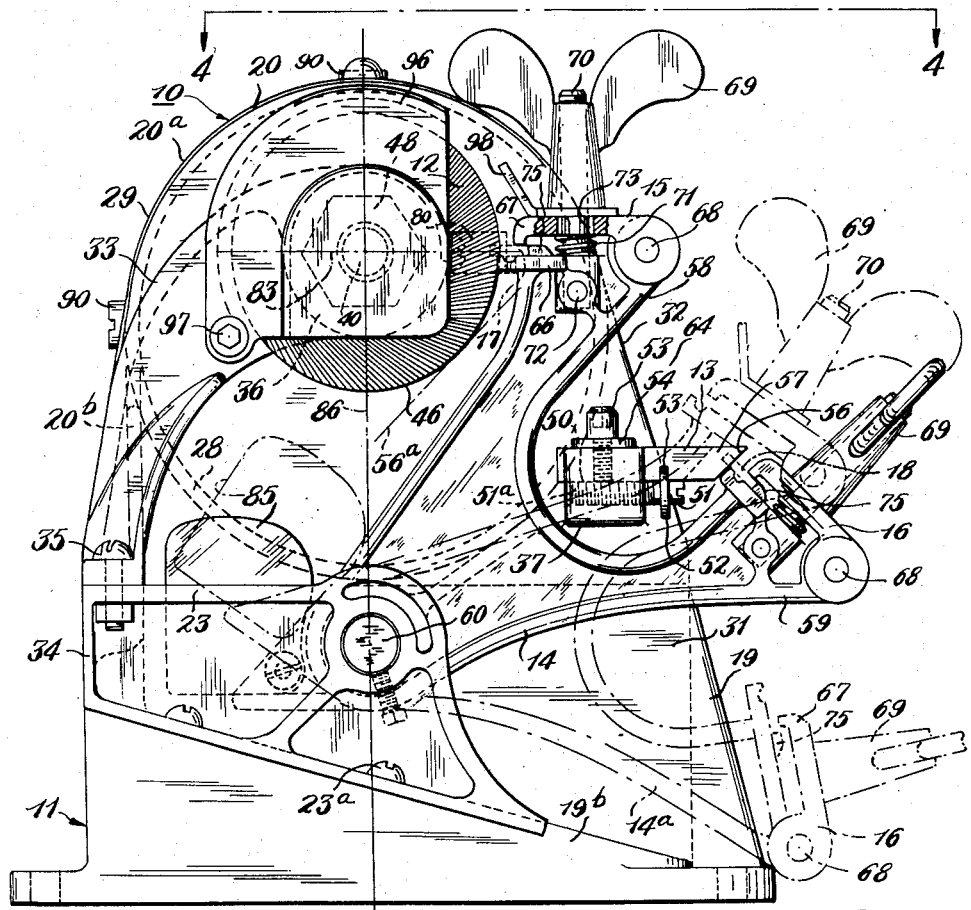
Fig. 2 is an end view of the machine as seen from the cutter end thereof.

A suitable hood or guard cover 96 is provided for the cutter 12 and partially shields the same, as shown in Figs. 1 and 2. The guard 96 is swingably mounted on the frame member 29 by means of a pivot screw 97. A transparent chip guard 98 is also provided on the clamping device 15 so as to be located in front of the cutter 12 during the cutting operation.

From the foregoing description and the accompanying drawings it will now be readily seen that this invention provides a combined machine frame and motor mounting of a form which is very practical and suitable for use in a key duplicating machine or elsewhere, and in which chambers or passages of the connected frame members conduct cooling air in heat exchange relation to the electric driving motor. It will now also be seen that the motor-receiving socket of the frame locates the motor in a position to be cooled by the air flow, and such that the axial ports provided in the housing of the motor form an extension of the air passage. Additionally, it will be seen that by having a portion of the frame form a shroud ring for the air impeller mounted on the motor shaft, a more effective and forced flow of the cooling air will be obtainable.

Although the combined machine frame and motor mounting of the present invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a combined machine frame and motor mounting, a frame having walls and provided with a base adapted to rest on a support, said frame being hollow so as to have a passage therein for a flow of cooling air therethrough, said frame having an opening in a wall thereof for connecting one end of said passage with atmosphere, socket means on said frame in communication with said passage at another point of the latter, a work shaft rotatably mounted on said frame and having a power input end extending into said passage, an electric motor having a housing and an armature shaft and being mounted on said frame by engagement of one end of said housing in said socket means, the other end of said housing extending from said socket means in a projecting relation thereto, gear means located in said passage and drivingly connecting said armature shaft with the power input end of said work shaft, and air impelling means driven by said motor and located in said passage and within said frame for causing the flow of air therethrough, cooperating portions of said motor housing and socket means forming another atmosphere connection for said passage such that the air traversing said passage is directed in heat-exchange relation to said motor, said housing having axial passages in the peripheral portion thereof and disposed in an annular group extending around and along the housing for forming said other atmosphere connection, the ends of said axial passages at one end of said annular group being in communication with said passage of said frame and the ends of said axial passages at the other end of said annular group being open to atmosphere.

2. In a combined machine frame and motor mounting, a frame structure comprising a hollow base section and a hollow support section connected therewith and supported thereby, said base and support sections having their hollow interiors in communicating relation and defining a passage for conducting a stream of cooling air, one of said sections having an air opening in the wall thereof providing an air inlet for said passage and the other of said sections having an air opening in the wall thereof providing an air outlet for said passage, shaft means rotatably supported by said frame structure and including a work shaft portion projecting therefrom, said shaft means having a power input portion disposed in said hollow support section, an electric motor having a housing and an armature shaft, said motor being mounted in the air opening of said support section for cooling contact by said stream gearing located in said support section for cooling contact by said stream and connecting said armature shaft in driving cooperation with said power input portion, and air impelling means located in said support section and driven by said motor for causing a flow of said cooling air through said passage, the housing of said motor having a substantial portion of the length thereof projecting from the air opening of said support section and provided with axial passages disposed in an annular group extending around and along the projecting housing portion, the ends of said axial passages at one end of said annular group being in communication with the passage of said frame structure and the ends of said axial passages at the other end of said annular group being open to atmosphere, said motor being mountable and dismountable relative to said support section by axial movement of the motor in the air opening of said support section.

References Cited in the file of this patent

UNITED STATES PATENTS

| 1,521,359 | Costa | Dec. 30, 1924 |
| 2,511,854 | Kane | June 20, 1950 |
| 2,721,427 | Dremel | Oct. 25, 1955 |

FOREIGN PATENTS

| 517,006 | Belgium | Feb. 14, 1953 |